(12) United States Patent
Huang et al.

(10) Patent No.: US 6,661,588 B1
(45) Date of Patent: Dec. 9, 2003

(54) OBJECTIVE LENS ANTI-SHOCK ADJUSTMENT DEVICE

(75) Inventors: Yin-Chun Huang, Hsinchu (TW); Shu-Ya Chiang, Taichung (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 10/064,834

(22) Filed: Aug. 22, 2002

(51) Int. Cl.[7] ............................. G02B 7/02; G11B 7/00
(52) U.S. Cl. .................. 359/819; 359/818; 359/822; 369/44.14; 369/44.15; 369/44.16
(58) Field of Search ........................... 359/819, 818, 359/822, 823, 824, 813, 814; 369/44.14, 44.15, 44.16, 244, 247, 263; 355/66, 8

(56) References Cited

U.S. PATENT DOCUMENTS

| | | | | |
|---|---|---|---|---|
| 5,161,067 A | * | 11/1992 | Tomiyama et al. | ......... 359/824 |
| 5,216,648 A | * | 6/1993 | Noda et al. | ............... 369/44.14 |
| 5,243,584 A | * | 9/1993 | Kang | ....................... 369/44.14 |
| 5,475,661 A | * | 12/1995 | Tomita et al. | ........... 369/44.16 |
| 5,787,067 A | * | 7/1998 | Song | .......................... 369/247 |

* cited by examiner

*Primary Examiner*—Georgia Epps
*Assistant Examiner*—Jack Dinh
(74) *Attorney, Agent, or Firm*—Jiang Chyun IP Office

(57) ABSTRACT

An objective lens anti-shock adjustment device comprises a holder that is capable of fixedly holding an objective lens via at least a fastening element. The holder is mounted in a casing by means of a plurality of resilient elements and a plurality of adjuster screws. The resilient elements connect the holder to the casing and the adjuster screws engage through the casing and abut against the holder opposite to the resilient elements in order to allow the adjustments of a vertical positioning and a horizontal orientation of the objective lens. The holder and the casing are provided with respective openings that expose a slot formed on the objective lens. By the external engagement of a tool through the openings into the slot, the objective lens is slid in the holder in order to adjust the depth of focus.

20 Claims, 6 Drawing Sheets

OBJECTIVE LENS ANTI-SHOCK ADJUSTMENT DEVICE

BACKGROUND OF THE INVENTION

1. Field of the Invention

The invention relates generally to an optical scanning module and, more particularly, to an objective lens anti-shock adjustment device arranged in the optical scanning module to mount an objective lens.

2. Description of the Related Art

A conventional flat bed type scanning apparatus comprises an optical scanning module that is capable of performing a forward and backward sliding movement under a transparent glass to scan a document placed on the transparent glass. The optical scanning module of the flat type scanning apparatus is usually driven by means of a motor and transmission elements.

Referring to FIG. 1, a schematic side view illustrates a conventional construction of an optical scanning module. An optical scanning module conventionally comprises a housing 170 in which are respectively arranged a light source 110, a reflective lens assembly 140, an objective lens 150, and an image sensor 160. The light source 110 projects a light on a document 120 that is placed on a transparent glass 130 to be scanned. The resulting light from the document 120 passes through the reflective lens assembly 140, composed of a plurality of reflective lenses (140a, 140b, 140c), is directed to the objective lens 150, and finally forms an image on the image sensor 160. The image sensor 160 may be, for example, a charge coupled device (CCD).

FIG. 2 is a perspective view that schematically illustrates an objective lens mounting device used to mount the objective lens 150 within the optical scanning module. FIG. 3 is a schematic view that particularly illustrates the mounting of the objective lens within the mounting device. As shown in FIG. 2, an objective lens mounting device 180 known in the prior art is traditionally formed with the housing 170 in a single body, and generally comprises a base to which is connected a hexagonal hollow tube 182 that receives the objective lens 150. The objective lens 150 can be slid along the axis of the hexagonal hollow tube 182 to adjust the depth of focus. Once the adequate depth of focus is obtained, a fixing screw locks the objective lens within the hexagonal hollow tube 182. As shown in FIG. 3, the objective lens 150 is thereby held via six contact points achieved through the six sides of the hexagonal tube 182.

As there are increasing demands for a scanning apparatus that has reduced dimensions, the useless portions of material of the objective lens 150 outside the image light path 152 accordingly have to be removed to reduce the size of the objective lens 150. FIG. 4 is a sectional view that shows the resulting section of an objective lens 150a modified according to the above requirement of dimensional reduction. As shown in FIG. 5, a disadvantage of the above dimensional reduction however is that the objective lens 150a may be subjected to a deviation from its correct horizontal orientation due to, for example, external shocks. As a result, the image light 152 does not entirely pass through the objective lens 150a, which negatively affects the image formation on the image sensor 160.

SUMMARY OF THE INVENTION

An aspect of the invention is therefore to provide an objective lens anti-shock adjustment device that enables the mounting of an objective lens and further protects the objective lens from external shocks.

Another aspect of the invention is to provide an objective lens anti-shock adjustment device that allows an optical adjustment of the objective lens according to different axes, and more particularly according to two translation axes for adjusting the depth of focus and the vertical positioning and one rotation axis for adjusting the horizontal orientation of the objective lens.

To accomplish the above and other objectives, the invention provides an objective lens anti-shock adjustment device that is arranged in an optical scanning module to mount an objective lens. The objective lens anti-shock adjustment device comprises a holder that is capable of fixedly holding the objective lens via at least a fastening element. The holder is mounted according to a flexible and adjustable manner in a casing by means of a plurality of resilient elements and a plurality of adjuster screws. The resilient elements connect the holder to the casing and the adjuster screws engage through the casing and abut against the holder opposite to the resilient elements in order to allow the adjustment of a vertical positioning and a horizontal orientation of the objective lens. The holder and the casing are provided with respective openings that expose a slot formed on the objective lens according to a direction perpendicular to the light path through the objective lens. By external engagement of a tool through the openings into the slot, the objective lens is slid in the holder in order to adjust the depth of focus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

The following detailed description of the embodiments and examples of the present invention with reference to the accompanying drawings is only illustrative and not limiting.

Figure 1:
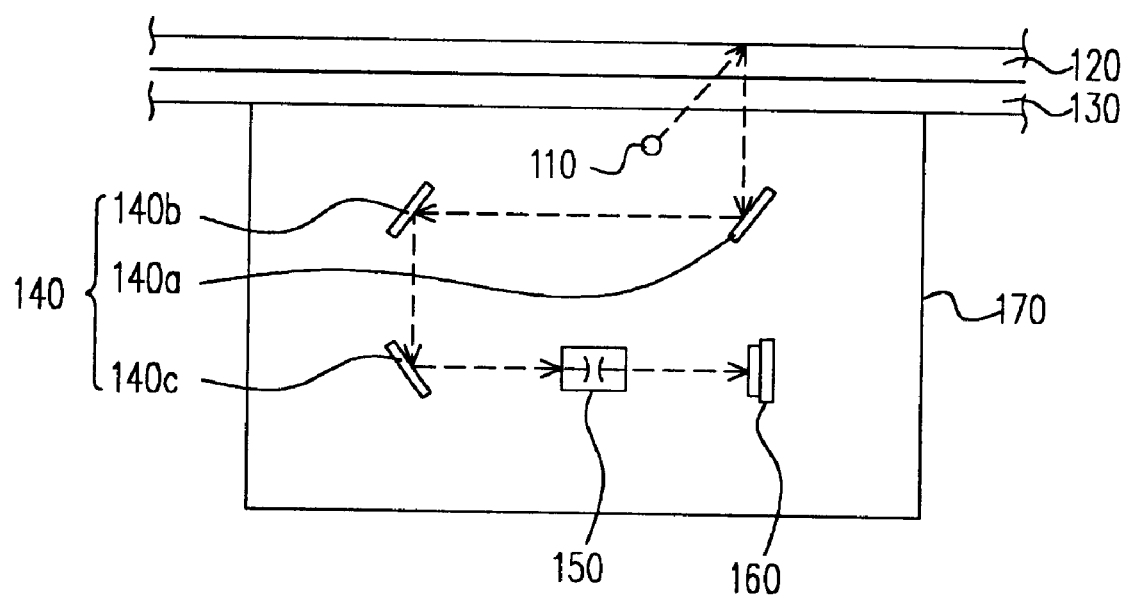
FIG. 1 is a schematic side view of an optical scanning module known in the prior art.
Figure 2:
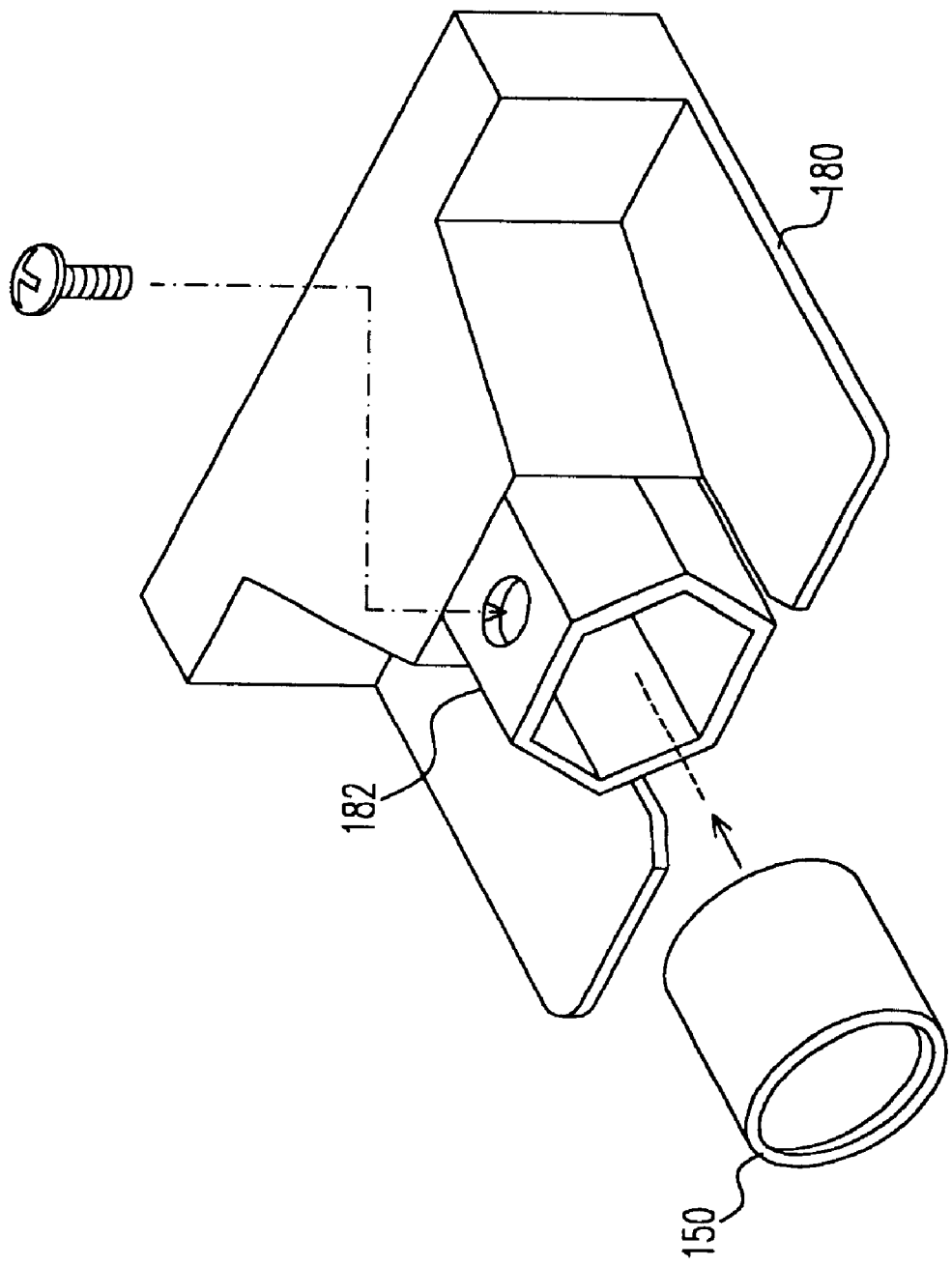
FIG. 2 is a perspective view of an objective lens mounting device known in the prior art.
Figure 3:
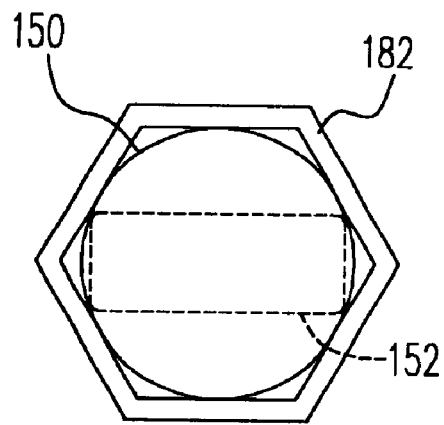
FIG. 3 is a schematic view particularly illustrating the mount of the objective lens in the objective lens mounting device of the prior art.
Figure 4:
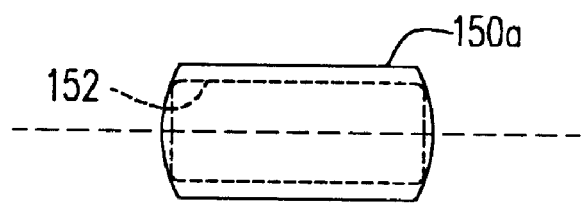
FIG. 4 is a sectional view schematically illustrating the shape of a section of an objective lens known in the prior art.
Figure 5:
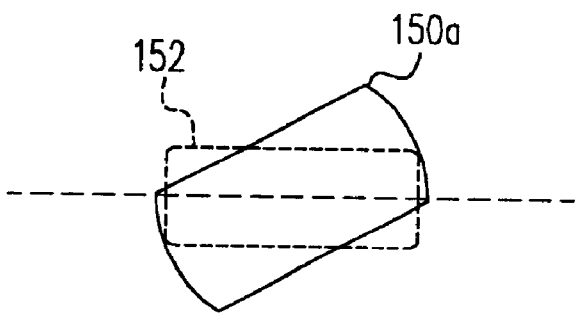
FIG. 5 is a schematic view showing the deviation of an objective lens.
Figure 6:
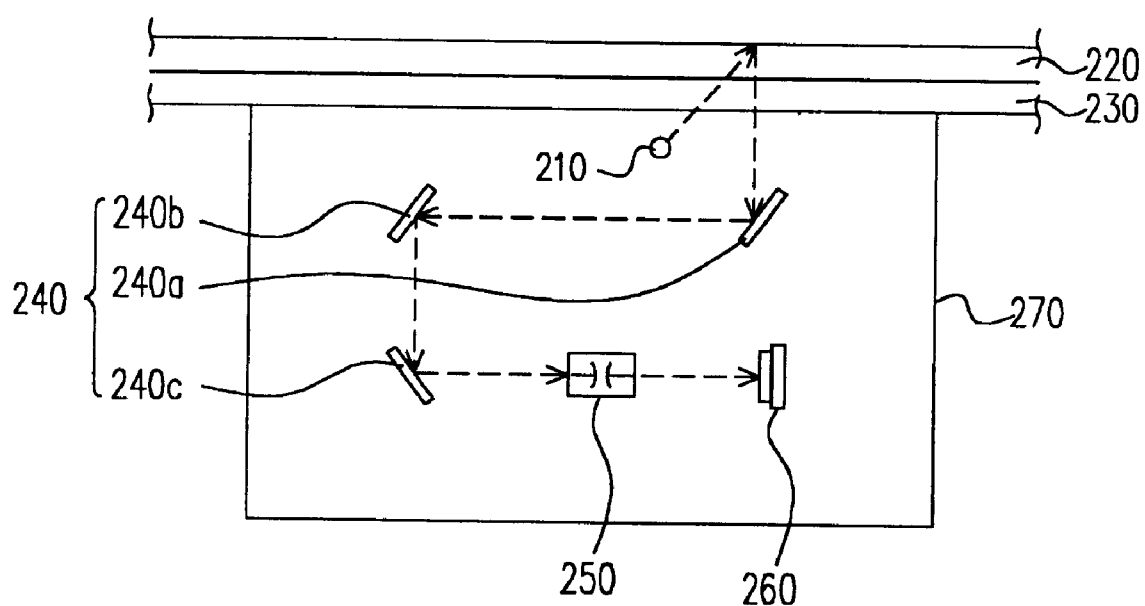
FIG. 6 is a schematic side view of an optical scanning module according to an embodiment of the invention.

Referring to FIG. 6, a schematic side view illustrates an optical scanning module according to an embodiment of the invention. An optical scanning module comprises a housing 270 in which are respectively arranged a light source 210, a reflective lens assembly 240 composed of lenses (240a, 240b, 240c), an objective lens 250, and an image sensor such as a charge coupled device (CCD) 260. During scanning, the light source 210 emits a light that passes through a transparent glass 230 to impinge on a document 220 placed on the transparent glass 230. The light from the document 220 then travels through the reflective lens assembly 240, is directed to the objective lens 250 and finally forms an image on the CCD 260.

Figure 7:
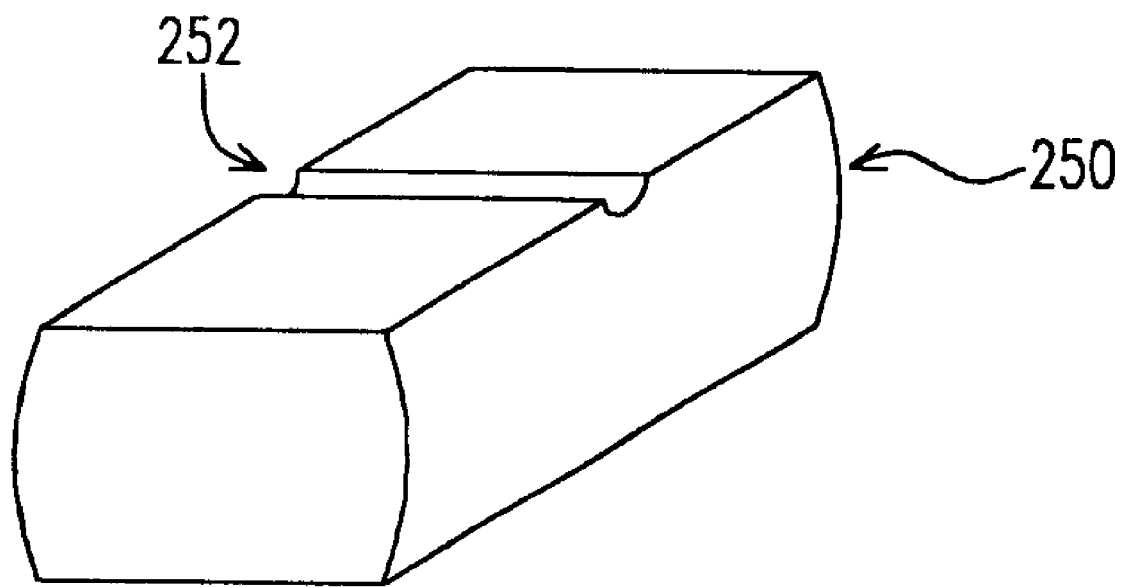
FIG. 7 is a perspective view of an objective lens according to an embodiment of the invention.

Referring to FIG. 7, a perspective view schematically illustrates an objective lens constructed according to an embodiment of the invention. As illustrated, a general shape of the objective lens 250 is achieved via removing the useless portions of material through which light does not pass. The dimensions of the objective lens 250 are therefore reduced. Furthermore, a slot 252 is defined on an upper surface of the objective lens 250. The slot 252 extends along a direction perpendicular to the light path through the objective lens 250. The disposition of the slot 252 enables an optical adjustment of the objective lens 250 when this latter is mounted in an objective lens anti-shock adjustment device of the invention as described hereafter.

Figure 8:
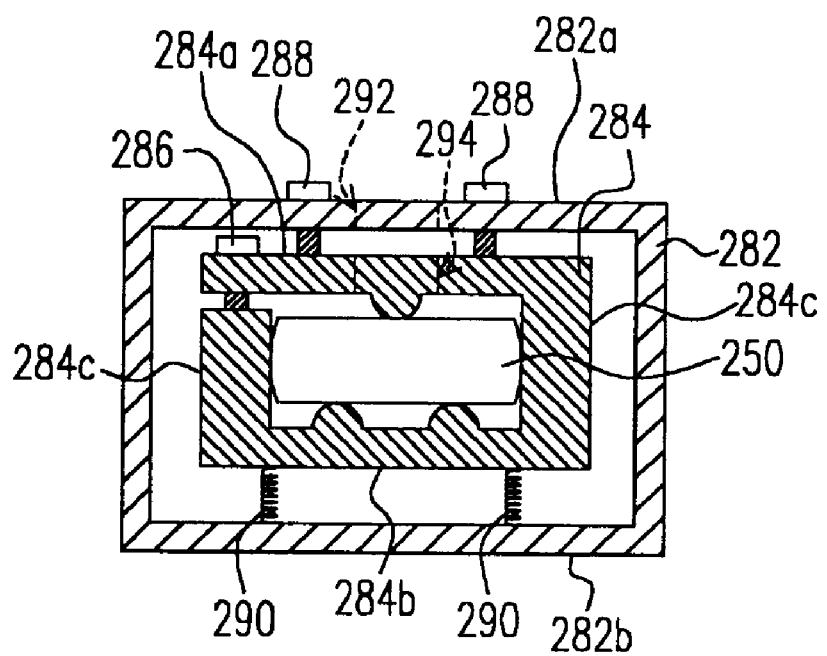
FIG. 8 and FIG. 9 are two sectional views schematically illustrating an objective lens anti-shock adjustment device according to two embodiments of the invention.

Referring to FIG. 8, a schematic sectional view illustrates the construction of an objective lens anti-shock adjustment device according to an embodiment of the invention. As illustrated, the objective lens anti-shock adjustment device comprises a holder 284, a casing 282, a plurality of resilient elements and a plurality of adjusting elements.

The resilient elements are, for example, springs 290 that connect bottom edge 282b of the casing 282 to bottom edge 284b of the holder 284.

The holder 284 comprises a top edge 284a, bottom edge 284b, and lateral edges 284c that define an inner space where is held the objective lens 250.

The adjusting elements include, for example, a plurality of adjuster screws 288 that engage through the top edge 282a of the casing 282 and abut against the top edge 284a of the holder 284 opposite to the springs 290. The springs 290 and the adjuster screws 288 thereby achieve a flexible and adjustable mount of the holder 284 within the casing 282.

The top edge 282a of the casing 282 and top edge 284a of the holder 284 respectively include openings 292, 294 that are arranged corresponding to the slot 252 of the objective lens 250. Once the objective lens 250 is mounted in the holder 284, and the holder 284 is arranged in the casing 282, the slot 252 is thereby accessible from the exterior through the openings 292, 294.

Furthermore, the top edge 284a of the holder 284 is preferably not connected to the lateral edge 284c. The objective lens 250 is fixedly clamped within the holder 284 by means of a fastening element such as a fastening screw 286 that tightly fastens an end of the top edge 284a to the lateral edge 284c.

Figure 9:
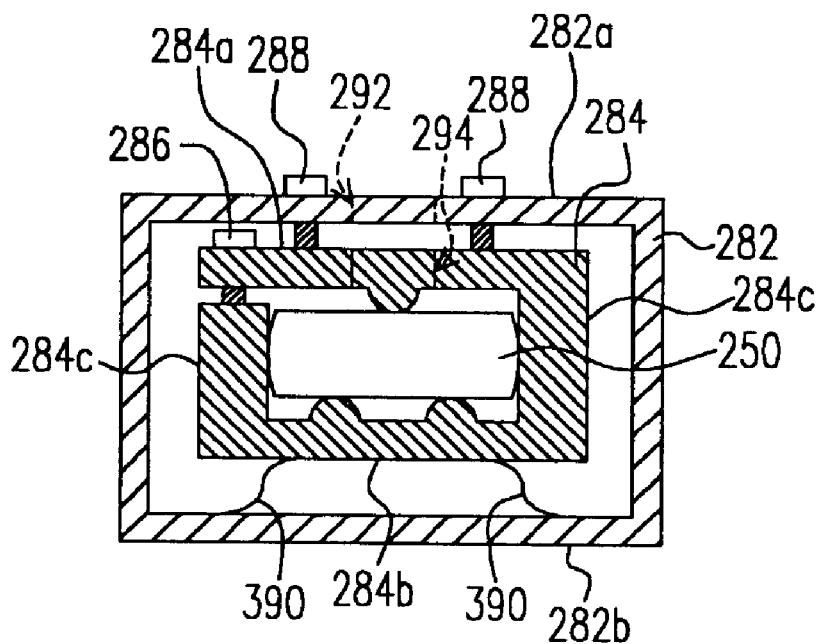

Instead of springs 290, other types of resilient elements may be alternatively envisaged as illustrated in FIG. 9, showing a schematic sectional view of a second embodiment of the invention.

In FIG. 9, the springs 290 (shown in FIG. 8) are replaced with a plurality of resilient plates 390 that connect bottom edge 282b of the casing 282 and bottom edge 284b of the holder 284. The resilient plates 390 may be formed with the casing 282 in a single body. Other parts and elements are similar to those illustrated in FIG. 8, and their description is therefore omitted.

As described above, the arrangement of resilient elements such as springs 290 or resilient plates 390 effectively absorbs external shocks. The adjustment of the anti-shock adjustment device is detailed hereafter.

To adjust the depth of focus, a tool such as, for example, a planar driving end of a screwdriver, is inserted through the openings 292, 294 into the slot 252 of the objective lens 250 to drive a forward/backward slide of the objective lens 250 (along a direction perpendicular to the views of FIG. 8 and FIG. 9). The vertical positioning and the horizontal orientation of the objective lens 250 in the casing 282 are adjusted by means of the adjuster screws 288. It will be understood that the terms "vertical" and "horizontal" herein refer to two perpendicular directions that are both perpendicular to the direction of the depth of focus. Tight clamping of the objective lens 250 by the holder 284 is further achieved by means of the fastening screw 286 that tightly fastens the top edge 284a of the holder 284 with its lateral edge 284c.

The above adjustment steps may be performed according to different sequences. However, a preferable adjustment sequence should start first with an adjustment of the depth of focus of the objective lens 250. Once the adequate depth of focus is obtained, the objective lens 250 is fixedly clamped via tightening of the fastening screw 286. Finally, the vertical positioning and the horizontal orientation are adequately adjusted by means of the adjuster screws 288. Once all the adjustments of the objective lens 250 are achieved, the connecting portions between screws 288, 286 and the casing 282 and holder 284 may be further securely fixed via dispensing of a fixing material thereon.

As described above, the invention therefore provides an objective lens anti-shock adjustment device that achieves a flexible and adjustable mount of an objective lens. The flexible and adjustable mount of the objective lens according to the invention protects the objective lens from external shocks, and further enables an optical adjustment of the objective lens according to different axes, more particularly according to two translation axes of vertical positioning and depth of focus and one rotation axis of horizontal orientation.

In an embodiment, a slot is formed on the objective lens along a direction perpendicular to the light path through the objective lens. The objective lens is held within a holder that, in turn, is mounted in a casing by means of a plurality of resilient elements and adjuster screws. The objective lens is fixedly clamped within the holder by means of a fastening screw. The resilient elements protect the objective lens from external shocks and the adjuster screws are operated to adjust the vertical positioning and the horizontal orientation of the objective lens. The slot of the objective lens is externally accessible from openings formed through the holder and casing, which further enables an adequate adjustment of the depth of focus of the objective lens.

It should be apparent to those skilled in the art that other structures that are obtained from various modifications and variations of different parts of the above-described structures of the invention would be possible without departing from the scope and spirit of the invention as illustrated herein. Therefore, the above description of embodiments and examples only illustrates specific ways of making and performing the invention that, consequently, should cover variations and modifications thereof, provided they fall within the inventive concepts as defined in the following claims.

What is claimed is:

1. An objective lens anti-shock adjustment device, arranged in an optical scanning module to mount an objective lens, the objective lens anti-shock adjustment device comprising:

a casing;

a holder, mounted in the casing according to a flexible and adjustable manner, the holder being capable of fixedly clamping the objective lens;

a plurality of resilient elements, connecting the holder to the casing; and a plurality of adjusting elements, engaging through the casing and abutting against the holder opposite to the resilient element in order to enable the adjustments of a vertical positioning and a horizontal orientation of the objective lens.

2. The device of claim 1, wherein the resilient elements include a plurality of springs.

3. The device of claim 1, wherein the resilient elements include a plurality of resilient plates.

4. The device of claim 3, wherein the resilient plates are formed with the casing in a single body.

5. The device of claim 1, wherein the adjusting elements include a plurality of adjuster screws.

6. The device of claim 1, wherein the objective lens is further provided with a slot thereon.

7. The device of claim 6, wherein the holder and the casing are respectively provided with a first opening and a second opening through which the slot of the objective lens is accessible from the exterior of the casing to slidably adjust a depth of focus of the objective lens.

8. The device of claim 1, wherein a fixing material is further formed on a plurality of connecting portions between the adjusting elements and the casing to further securely fix the adjusting elements.

9. The device of claim 1, wherein the holder is further provided with a fastening screw that tightens the holder in order to clamp the objective lens.

10. The device of claim 9, wherein a fixing material is further formed on a plurality of connecting portions between the fastening screw and the holder to further securely fix the fastening screw.

11. An optical scanning module, mounted in a scanning apparatus to scan a document, the optical scanning module comprising:

a housing;

a light source, arranged in the housing to project a light on a document being scanned;

a reflective lens assembly, arranged in the housing and receiving an image light from the document being scanned;

a casing, mounted in the housing of the optical scanning module;

an objective lens, placed within the casing and receiving the image light from the reflective lens assembly;

a holder, slidably mounted in the casing, the holder being capable of fixedly clamping the objective lens;

a plurality of resilient elements connecting the holder to the casing;

a plurality of adjusting elements, engaging through the casing and abutting against the holder to enable the adjustments of a vertical positioning and a horizontal orientation of the objective lens; and an image sensor, fixedly attached on a circuit substrate and receiving the image light from the objective lens.

12. The module of claim 11, wherein the resilient elements include a plurality of springs.

13. The module of claim 11, wherein the resilient elements include a plurality of resilient plates.

14. The module of claim 13, wherein the resilient plates are formed with the casing in a single body.

15. The module of claim 11, wherein the adjusting elements include a plurality of adjuster screws.

16. The module of claim 11, wherein the objective lens further includes a slot thereon.

17. The module of claim 16, wherein the holder and the casing are respectively provided with a first opening and a second opening through which the slot of the objective lens is accessible from an exterior of the casing to slidably adjust a depth of focus of the objective lens.

18. The module of claim 16, wherein a fixing material is further formed on a plurality of connecting portions between the adjusting elements and the casing to further securely fix the adjusting elements.

19. The module of claim 11, wherein the holder is further provided with a fastening screw that tightens the holder in order to clamp the objective lens. connecting portions between the fastening screw and the holder to further securely fix the fastening screw.

20. The module of claim 19, a fixing material is further formed on a plurality of connecting portions between the fastening screw and the holder to further securely fix the fastening screw.

* * * * *